United States Patent [19]

Diskowski et al.

[11] 4,225,347
[45] Sep. 30, 1980

[54] CARBON CARRIER SUITABLE FOR USE IN ELECTROTHERMAL REDUCTION PROCESSES, AND PROCESS FOR MAKING IT

[75] Inventors: Herbert Diskowski; Hans Ebert; Winfried Kern, all of Erftstadt; Hans Rabowsky; Bernhard Schäfgen, both of Hürth; Joachim Stendel, Brühl, all of Fed. Rep. of Germany

[73] Assignee: Hoechst Aktiengesellschaft, Frankfurt am Main, Fed. Rep. of Germany

[21] Appl. No.: 24,417

[22] Filed: Mar. 27, 1979

[30] Foreign Application Priority Data

Apr. 1, 1978 [DE] Fed. Rep. of Germany ....... 2814106

[51] Int. Cl.$^2$ ............................ C22B 9/10; C22B 1/08

[52] U.S. Cl. ............................................. 75/257; 75/3; 75/53

[58] Field of Search ......................................... 75/3-5, 75/53, 257, 25, 10 R, 11, 27

[56] References Cited

U.S. PATENT DOCUMENTS

| 3,175,900 | 3/1965 | Johnson | 75/11 |
| 3,666,438 | 5/1972 | Madronic | 75/11 |

Primary Examiner—P. D. Rosenberg
Attorney, Agent, or Firm—Connolly and Hutz

[57] ABSTRACT

The invention provides carbon carriers of improved reactivity suitable for use in slag-forming electrothermal reduction processes. The improved carbon carriers contain 5 to 80 weight % of the particular slag formed in the reduction process. The invention also provides a process for making the carbon carriers.

11 Claims, 1 Drawing Figure

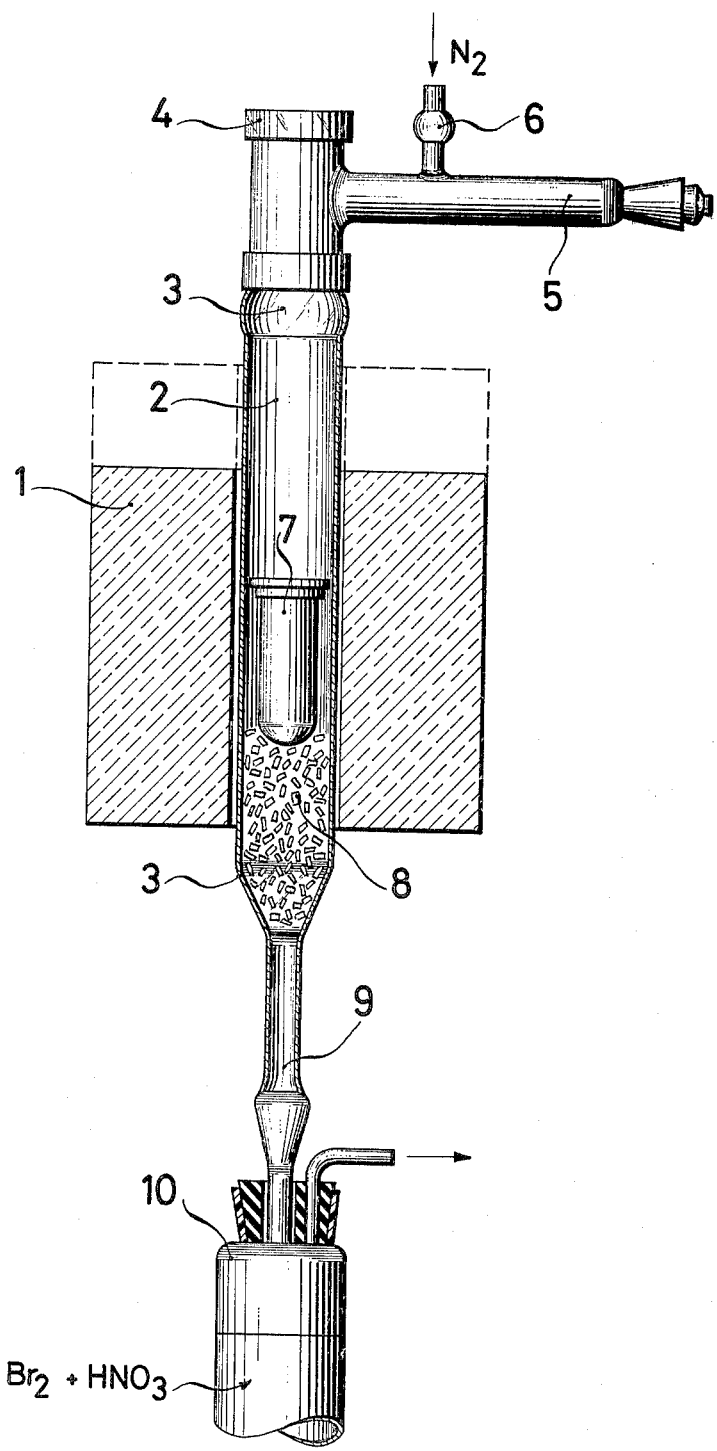

CARBON CARRIER SUITABLE FOR USE IN ELECTROTHERMAL REDUCTION PROCESSES, AND PROCESS FOR MAKING IT

The present invention relates to a carbon carrier and to a process for making it, the carbon carrier being suitable for use in slag-forming electrothermal reduction processes.

Vital to the effectiveness of reduction processes which are carried out in contact with carbon (blast-furnace process, electrothermal process) is the reactivity of the carbon or carbon-yielding material.

The term "reactivity" as used herein means the capacity of a carbon-containing material to effect a certain reaction velocity under defined reaction conditions.

Use has long been made in the iron and steel producing industries of the reactivity of coke, which manifests itself in the reaction velocity, for evaluating the quality of blast-furnace coke. A typical test reaction is the Boudouard-reaction, wherein $CO_2$ is contacted with coke to give CO. It has been described that the reactivity of coke is the greater the larger the quantity of $CO_2$ which is converted to CO per unit time in contact with a quantity of coke of given particle size (K. Hedden, Brennstoff-Chemie 41, page 193 (1960)).

As has been found the results obtained in the above test reaction are not directly of assistance in other, especially in electrothermal processes. It has more particularly been found that it is necessary for the test reaction to be carried out under conditions substantially the same as those selected for the specific reduction reaction.

The reactivity determined in the above test reaction must be related to the particular conditions prevailing inside the furnace mixture which undergoes reaction. It is more specifically necessary for the reactivity to be determined on the basis of the conversion per unit time in a given volume of furnace mixture, and to be related to the geometric form of the carbon particles present in, and forming part of, the furnace mixture. In other words, the reactivity is an index of the quantity of product produced per unit time in contact with a carbon carrier, of which the particles have been given a certain geometric configuration. The effective reactivity can be calculated in accordance with the following formula:

$$R_{eff} = \frac{\alpha}{(\% \, C/100) \, \rho^\circ}$$

in which $\alpha$ stands for the specific reactivity of the carbon material used, % C stands for the content of C of the carbon carrier, and $\rho o$ stands for the specific gravity of the carbon carrier; the specific reactivity $\alpha$ is determined on the evidence of the velocity with which the reaction occurs in contact with carbon material of a given geometric configuration.

The present invention now provides a carbon carrier of improved reactivity suitable for use in slag-forming electrothermal reduction processes, the carbon carrier containing 5 to 80 weight %, preferably 20 to 50 weight %, of the particular slag formed in the reduction process.

It is preferable for the carbon carrier to contain the slag in the form of particles with a size of less than 6 mm, preferably up to 1 mm. It is also advantageous in accordance with this invention to use the carbon carrier in the form of mouldings containing slag in admixture with a strength increasing binder.

The carbon carriers are made by mixing material consisting substantially of carbon with the slag obtained in the respective reduction process.

The above mixture of carbon material and slag should conveniently be pelletized or briquetted and in this manner converted to mouldings. As already stated above, it is possible by the use of a suitable binder to improve the strength of the resulting mouldings. The useful binders comprise, for example: soft pitch, coal-tar pitch, sulfite waste liquor and alkali water glass, the latter being preferred.

It is also preferable to use coke breeze with a particle size of less than 6 mm, preferably up to 1 mm, as the carbon constituent.

The same is true concerning the slag which should also be used in the form of particles with a size of less than 6 mm, preferably up to 1 mm.

To facilitate operation, it is good practice initially to mix the carbon material with the slag or components forming it, and then to subject the resulting mixture to coking, the slag and/or components forming it being used in a quantity necessary for the coked material to contain 5 to 80 weight % of slag.

Needless to say, by the use of carbon carriers of improved reactivity, it is possible favorably to influence electrothermal reduction processes.

As a result of the improved reactivity of the carbon carrier, it is possible for the reduction process to be effected at satisfactory velocity at temperatures lower than those used heretofore, and to avoid undesirable overheating with its known adverse effects.

In addition to this, the electrode consumption rate is reduced and electrode breakage which often accompanies too rapid and frequent electrode advancement is substantially avoided. Last but not least the carbon carrier of the present invention permits the reduction yield to be improved.

The following experiments were made to further illustrate the invention. They describe by way of example the reduction of phosphate ore.

Experimental Conditions (a) General

The experiments were made to determine the effective reactivity $R_{eff}$ of carbon carriers for use in electrothermal reduction processes. More specifically, the reactivity of a carbon carrier for use in the electrothermal production of phosphorus was determined. The test reaction comprised the reduction of phosphate with the aid of coke. The direct test result obtained was the specific reactivity $\alpha$. This was used as the basis for determining the effective reactivity with the aid of the specific gravity $\rho o$ of the carrier and the proportion of carbon % C/100 present in the carbon carrier.

To determine the specific reactivity $\alpha$, the phosphate reduction velocity was identified by reacting Kola phosphate with a carbon carrier. Both the phosphate and carbon carrier were used in the form of cylindrical mouldings. These were superposed one on the other with their cylindrical faces adjoining so that the reaction occurred at the contact surface between phosphate and carbon carrier mouldings. Related to the contact surface was the conversion per hour. The temperature was maintained constant during the experiment.

(b) Apparatus

The experiments were carried out in the apparatus shown diagrammatically in the accompanying drawing. A movably arranged tubular furnace of silicon carbide heatable to temperatures of up to 1600° C. was used as the heating means. Placed in the furnace 1 was a ceramic pipe 2 of which the two ends had glass structures 3 fused thereto. The upper end of the tubular furnace 1 was closed by means of a plane parallel glass plate 4, for inspection and temperature measurement. Disposed in a lateral connection 5 was a scavenging gas ($N_2$) inlet 6. Specimens were placed in a graphite crucible 7 which in turn was placed on crushed ceramic material 8. The pipe 2 had a constricted lower outlet end 9 to provide support for the ceramic material, and it opened into a washing bottle 10. Series connected thereto were a further three wash bottles (not shown in the drawing). The wash bottles were filled with concentrated nitric acid containing some minor quantity of elemental bromine.

(c) Material Used in Experiments (1) Cylindrical mouldings 1.2 cm in diameter (89% carbon) made from lump coke 18 to 25 mm in diameter
(2) Coke breeze <1 mm (85% carbon)
(3) Kola phosphate ore (39.2% $P_2O_5$)
(4) Water-glass (352 g/l $SiO_2$; 144 g/l NaOH)
(5) Sulfite waste liquor (45% dry substance)
(6) Phosphorus furnace slag <0.1 mm (42.6% $SiO_2$; 47.2% CaO; 2.7% F; 0.84% P).

The carbon carrier used in each particular case had a surface area of 1.13 cm².

Mouldings were made from coke breeze and slag with the use of water-glass, sulfite waste liquor and mixtures thereof, respectively, as the binder. More specifically, coke breeze (<1 cm) was mixed with ground slag (<0.1 cm), the mixture was wetted with the binder and moulded. The stamp had a diameter of 12 mm and the pressure was approximately 3500 atmospheres gauge. The mouldings were dried at 200° C.

Kola phosphate mouldings were made by moulding crude material (80%=0.1 mm) wetted with water. The carbon carrier was in each case reacted with a Kola phosphate moulding.

The reactivity of graphite was determined (experiment 1 in the following Table). The test material was the bottom of a graphite crucible on which was placed a Kola phosphate moulding.

In all other experiments, the carbon carrier was placed on the bottom of the crucible and the Kola phosphate moulding was placed on the carbon carrier. The reaction zone comprised the contact area between carbon carrier and Kola phosphate moulding.

The reaction velocity of Kola phosphate with the carbon carrier in the graphite crucible under nitrogen was investigated as follows, in the furnace described above:

The apparatus was heated so as to establish a temperature of 1350° C. in the crucible within 75 minutes. The temperature was measured pyrometrically. The resulting phosphorus in vapor form was delivered with the aid of $N_2$(5 l/h) to the wash bottles which were filled with bromine-containing concentrated nitric acid. After 1 hour at 1350° C., the experiment was stopped by closing the wash bottles. Bromine and nitric acid in excess were boiled down and a phosphate determination was made.

The effective reactivity $R_{eff}$ was identified as follows:

Always placed on the bottom of the graphite crucible was the carbon carrier and placed thereon was the Kola phosphate moulding. The temperature was 1350° C. in all cases. The following carbon carriers were used: Graphite (experiment 1), coke (experiment 2) and mouldings made from blends of coke breeze (particle size <1 cm) and phosphorus furnace slag (<0.01 cm). The mouldings were made with the use of sulfite waste liquor and water-glass solutions, respectively (experiments 3 to 9).

As can be seen from the following Table, the effective reactivity of the carbon carrier increased with an increasing proportion of slag therein. Water-glass was found to be considerably more effective than sulfite waste liquor.

As compared with standard coke, the slag-containing carbon carrier of the present invention has an effective reactivity improved by more than 1000%.

Determination of effective reativity $R_{eff}$ $$R_{eff} = \frac{\alpha}{(\% \ C/100) \cdot \rho°}$$

TABLE

| Exp. No. | C-carrier % C | binder | $\rho°$ | Result $\alpha^*$ | $R_{eff}$ | $\frac{R_{eff}}{R_{eff}}$ coke |
|---|---|---|---|---|---|---|
| 1 | 100 | — | 2.2 | 11.50 | 5.23 | 0.42 |
| 2 | 100 | — | 1.22 | 15.04 | 12.32 | 1 |
| 3 | 80 | sulfite waste liquor | 1.34 | 15.93 | 14.86 | 1.21 |
| 4 | 50 | sulfite waste liquor | 1.48 | 16.81 | 22.72 | 1.84 |
| 5 | 20 | sulfite waste liquor | 1.62 | 46.01 | 142.01 | 11.53 |
| 6 | 50 | sulfite waste liquor + water-glass | 1.48 | 23.01 | 31.10 | 2.52 |
| 7 | 70 | water-glass | 1.38 | 47.79 | 49.47 | 4.00 |
| 8 | 50 | water-glass | 1.48 3.78 | 34.51 | 3.78 | |
| 9 | 20 | water glass | 1.65 | 156.63 | 474.64 | 38.53 |

*The specific reactivity $\alpha$ indicates the reaction velocity related to the geometric surface area of the respective carbon carrier. It is expressed as phosphorus produced per hour, in milligrams and related to the surface aforesaid in cm².

We claim:

1. Carbon carrier of improved reactivity suitable for use in slag-forming electrothermal reduction processes, the carbon carrier containing 5 to 80 weight % of slag deriving from the particular reduction process in which the carbon carrier is to be used.

2. Carbon carrier as claimed in claim 1, containing 20 to 50 weight % of said slag.

3. Carbon carrier as claimed in claim 1, containing the slag in the form of particles with a size smaller than 6 mm.

4. A process for making a carbon carrier suitable for use in slag-forming electrothermal reduction processes, which comprises mixing a material consisting essentially of carbon with the slag formed in the reduction process.

5. The process as claimed in claim 4, wherein the mixture of carbon material and slag is moulded by modulizing it.

6. The process as claim in claim 4, wherein the mouldings are made with the use of a binder.

7. The process as claimed in claim 4, wherein coke breeze is used as the carbon material.

8. The process as claimed in claim 7, wherein the coke breeze has a particle size of less than 6 mm.

9. The process as claimed in claim 4, wherein the slag has a particle size smaller than 6 mm.

10. The process as claimed in claim 4, wherein the carbon material is mixed with the slag or components forming it and the resulting mixture is subjected to coking, the slag and/or components forming it being used in a quantity necessary for the coked material to contain 5 to 80 weight % of slag.

11. A process for making a carbon carrier suitable for use in slag-forming electrothermal reduction process, which comprises mixing a material consisting essentially of carbon together with the components forming the said slag.

* * * * *